Jan. 20, 1970  C. W. SMITH, JR  3,490,796
RESILIENT FASTENER

Filed Nov. 2, 1967 2 Sheets-Sheet 1

INVENTOR.
Charles W. Smith, Jr.
BY
Webb, Burden, Robinson & Webb
HIS ATTORNEYS

INVENTOR.
Charles W. Smith, Jr.
BY
Webb, Burden, Robinson & Webb
HIS ATTORNEYS

United States Patent Office 3,490,796
Patented Jan. 20, 1970

3,490,796
RESILIENT FASTENER
Charles W. Smith, Jr., Erie, Pa., assignor to Autoclave
Engineers, Inc., Erie, Pa., a corporation of Pennsylvania
Continuation-in-part of application Ser. No. 518,500,
Nov. 12, 1965. This application Nov. 2, 1967, Ser.
No. 680,162
Int. Cl. F16l 23/00
U.S. Cl. 285—412          6 Claims

ABSTRACT OF THE DISCLOSURE

A resilient fastener for securing together two members having opposed portions, each having apertures through which an elongated rod extends. A resilient tubular toroid is positioned on the rod and extends completely around the rod, whereby forces stressing the members are exerted against the resilient tubular toroid to deform it along its axis.

---

This application is a continuation-in-part of my copending application Ser. No. 518,500 of the same title, filed Nov. 12, 1965, and now abandoned.

This application relates to a resilient fastener which is useful for securing together two members and which are subjected to severe forces tending to separate the members and to thereby stress the fastener beyond its elastic limit to the extent that it is no longer able to maintain a tight joint between the two members.

SUMMARY OF THE INVENTION

Briefly, I have invented a resilient washer which includes a tubular toroid, such as at least one helical spring, which is curved along its length to form a closed circle with a central opening. The spring is positioned between two solid washers, each of which have central openings therethrough. Force applied perpendicular to each of the washers compresses the spring axially and along its length.

The washers may be held in contact with the spring so that the openings in the washers and spring are in line for passage of a rod through the openings.

My resilient washer forms part of a resilient fastener which comprises an elongated rod which passes through apertures in opposed portions of two members to be held together. Stops or other means are provided on the rod so that the two members cannot slide off the ends of the rod. At least one end of the elongated rod has means whereby the opposed portions of the two members can be moved along the axis of the rod toward each other so as to press and hold the two members against each other. Between the ends of the elongated rod is my resilient washer including a resilient tubular member or toroid which surrounds the rod and which is subjected to the force holding the two members together. A substantial portion of a cycling or a suddenly applied force tending to separate the two members is absorbed by compression of the toroid along its central axis, i.e., in a direction parallel to the axis of the rod, thereby preventing stress of the elongated rod beyond its elastic limit.

The fastener which I have invented may be used to hold together opposed flanges on the ends of two tube lengths which are subjected to high temperatures such that thermal expansion of the flanges and the adjacent portions of the tubes would stress a conventional fastener beyond its elastic limit so that upon a reduction in temperature the joint leaks. Also, cyclic variations in temperature or pressure or both may cause conventional fasteners to fail through fatigue.

My fastener may also be used to secure two members together which may be subjected to severe and sudden shocks tending to separate the two members. Thus, in the case of heavy pieces of machinery bolted to a base, an extreme and sudden shock applied to the base of the machinery may shear the bolts. My fastener will absorb the shock and prevent shearing of the bolts.

My fastener may also be used to secure heavy pieces of machinery, which are subject to vibrations, to a stationary base and thereby dampen the vibrations of the heavy pieces of machinery.

In the accompanying drawings I have illustrated certain presently preferred embodiments of my invention, in which.

Figure 1:
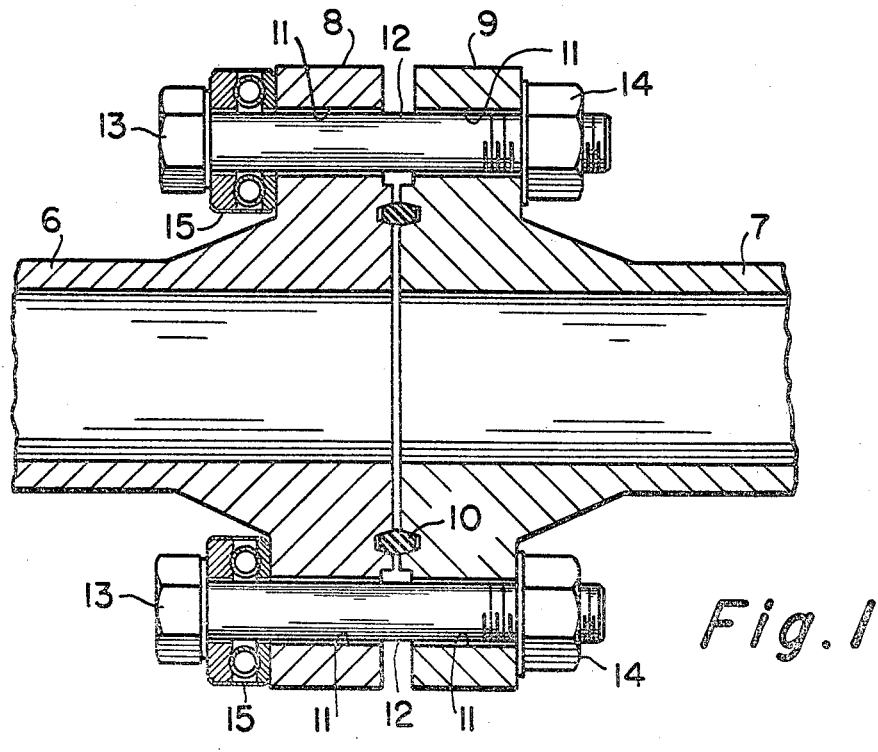
FIGURE 1 is a partial longitudinal section of two lengths of tubing secured together end to end in accordance with my invention.

FIGURE 1 of the drawings shows two lengths of tubing 6 and 7 which are secured together end to end by means of my resilient fastener. The lengths of tubing have opposed flanges 8 and 9 which are pressed against each other and hold between them a sealing member 10 such as is used with a ring joint flange.

The opposed flanges 8 and 9 have apertures 11 which are positioned in the flanges 8 and 9 so that the apertures in one flange are in line with corresponding apertures in the opposite flange. Elongated rods 12 pass through the apertures 11 and have on each end extending beyond flanges 8 and 9 a stop or other means for preventing the flanges 8 and 9 from moving off the ends of the rods 12.

In the specific example shown in FIGURE 1, the elongated rod 12 is a conventional bolt having a head 13 at one end and a nut 14 threaded on the other end of the rod.

Figure 2:
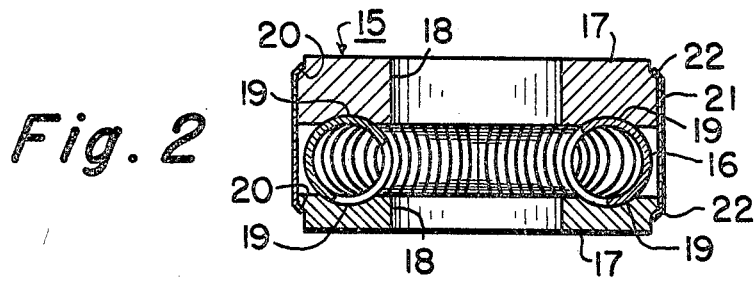
FIGURE 2 is a longitudinal section of a resilient washer which forms part of my resilient fastener.
Figure 3:
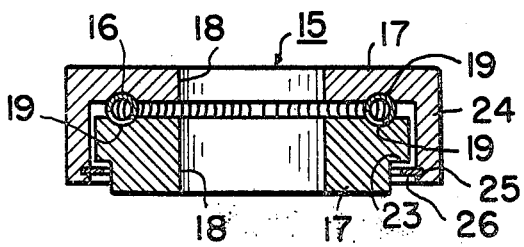
FIGURE 3 is a longitudinal section of a modified form of resilient washer.

Between at least one of the flanges 8 or 9 and either the head 13 or the nut 14, there is a resilient washer 15, two forms of which are shown in FIGURES 2 and 3. The resilient washer comprises a tubular resilient toroid 16 which is shown in FIGURES 2 and 3 as a helical spring which is curved so that the spring forms a complete circle. On either side of the spring 16 there is a flat washer 17, each of which has a central opening 18. The central openings 18 of the flat washers are axially in line with the central opening of the toroid 16. Grooves 19 in the sides of the washers which are against the toroid 16 hold the washers and the toroid so that their respective openings are laterally in line as just described.

The resilient washer also has means for holding the flat washers 18 and the toroid 16 together axially. FIGURES 2 and 3 show two different arrangements for holding the washers and toroid together. In the structure shown in FIGURE 2, the outer sides of the two washers are reduced in diameter to form shoulders 20 and a cylinder 21 is fitted over the washers 18. The edges 22 of the cylinder 21 are crimped over the shoulders 20 so as to hold the washers 18 and toroid 16 together.

In the structure shown in FIGURE 3 the outer edge of one washer is recessed to form a shoulder 23. The other washer has an axially extending flange 24 which extends past the toroid 16 and past the shoulder 23 in the opposed washers. The end of the flange 24 beyond the shoulder 23 in the opposed washer has a groove 25 into which a snap ring 26 is fitted. This snap ring 26 extends radially inwardly from the groove 25 beneath the shoulder 23 so that the two washers on the opposite sides of the toroid 16 cannot be moved axially from each other more than a very limited distance.

The two pipe lengths 6 and 7 having flanges 8 and 9 are connected end to end by positioning them as shown in FIGURE 1 in which the flanges 8 and 9 are opposite to each other and hold between them a lens ring seal 10.

Bolts 12 are passed through aligned apertures 11 in the flanges 8 and 9 after resilient washers 15 have been passed over the bolts so that they are between the heads 13 on the bolts and one of the flanges 8 or 9. Nuts 14 are then threaded onto the bolts and tightened so as to slightly compress the toroid 16 in the direction of its central axis. Alternatively, the resilient washers 15 can be placed on the bolts after they have been passed through both flanges 8 and 9 and the nuts 14 are threaded onto the bolts and turned against the washers 15 to slightly compress them.

In the event that the interiors of the tubes 6 and 7 are subjected to a high temperature, the portions of these tubes adjacent to each other and the flanges 8 and 9 expand. The resulting thermal expansion may be so great that the bolts 12 would, in the absence of the resilient washer 15, be stressed beyond their elastic limits with the result that, upon cooling of the tubes 6 and 7 and of the flanges 8 and 9, there would no longer be a tight joint between the opposed ends of the tubes 6 and 7 and the flanges 8 and 9. However, in accordance with my invention, the resilient tubular toroid 16 is compressed upon thermal expansion of the adjacent portion of the tubes 6 and 7 and of the flanges 8 and 9 and thereby axially absorbs a force which would otherwise overstress the bolts 12. Upon lowering of the temperature of the tubes 6 and 7, the resilient tubular toroid 16 expands thereby forcing the opposed end of the tubes 6 and 7 and the flanges 8 and 9 against each other to maintain a tight joint.

On the other hand, if the interior of the tubes 6 and 7 is subjected to an extremely low temperature, the adjacent ends of the tubes and the flanges 8 and 9 will contract and, in the absence of the resilient tubular toroid 16, this contraction would produce a loose joint between the tubes 6 and 7. However, as previously noted, the nuts 14 have been tightened on the bolts 12 so as to slightly compress the toriod 16. Therefore, upon thermal contraction of the tubes 6 and 7 and the flanges 8 and 9, the toroid 16 expands axially and thereby maintains a tight joint between the tubes 6 and 7 and the flanges 8 and 9.

In FIGURES 1 to 3 inclusive of the drawings, the toroid 16 has been shown as a helical spring which surround the bolts 12. However, the toroid 16 may be in the form of any resilient tubular member in the appproximate form of a circle surrrounding the bolts 12. Thus, the resilient tubular member or toroid may be a helical spring (as illustrated), a continuous metal tube, segments of tubes or springs, or C-shaped segments positioned side by side. In the specification the resilient tubular toroid has been described as a helical spring in the interests of brevity. It will be understood, however, that other forms of resilient tubular members or toroids can be used, so long as they are capable of being compressed in a direction normal to the axis along their lengths.

Figure 7:
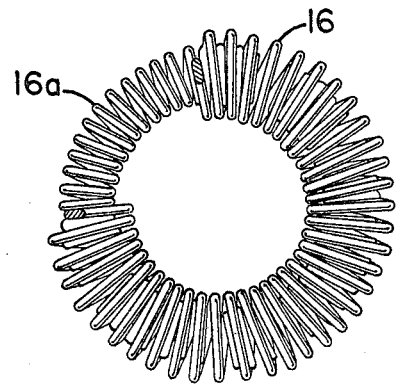
FIGURE 7 is a plan view of a modified tubular member having two springs, the outer one being shown broken away.

If a single tubular member does not have sufficient strength to absorb resiliently the forces imposed on it, a second tubular member can be placed inside the first tubular member so that compression of both members will absorb the force without either being deformed upon its elastic limit. In other words, where a single helicial spring 16 does not have sufficient strength to resiliently absorb forces imposed upon it, a second spring 16a can be placed inside the first spring as shown in FIGURE 7.

It has been explained how the resilience of the toroid 16 compensates for thermal expansion and contraction of the tubes 6 and 7 and the flanges 8 and 9. An important aspect of this compensation is that the toroid 16 is capable of responding to rapid cycling of pressure and temperature conditions, thereby preventing early fatigue and failure of parts of the joint between the tubes 6 and 7, particularly the bolts 12, which would otherwise occur.

The wire forming the helical spring which in turn constitutes the toroid 16 in the structure shown in FIGURES 1 to 3 inclusive can have any shape in section. However, in order to obtain maximum load and maximum deflection from the helical spring, the cross-section of the wire used in forming the spring is preferably square. Actually, the coils of the springs are square in section only after the spring has been formed. The springs are made preferably by coiling wire which is trapezoidal in section before it is coiled. When it is coiled, the resulting spring has coils which are square in section due to the fact that in coiling, the inner side of the wire tends to spread and the outer side of the wire tends to contract. As explained above, if a single helical spring does not have sufficient strength to resiliently absorb the forces imposed on it, a second spring can be placed inside the first spring.

Figure 4:
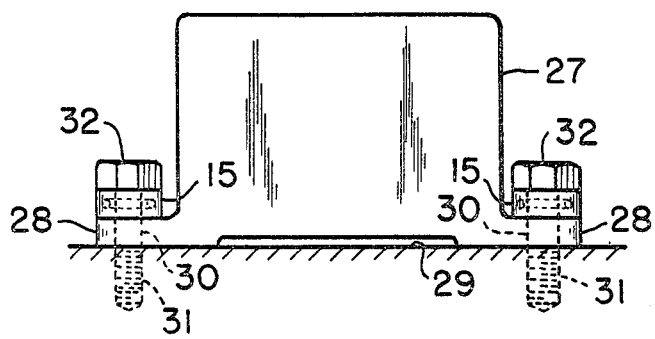
FIGURES 4 and 5 are elevation views partially in section showing the use of my resilient fastener to secure heavy pieces of equipment for bases for that equipment.

FIGURE 4 shows the application of a resilient washer, such as is shown in FIGURES 2 or 3, for the mounting of a heavy piece of equipment to a base. A heavy piece of equipment 27 has outwardly extending lugs 28 which rest on a base 29 for the equipment. The lugs 28 have apertures 30 through which bolts 31 having heads 32 are passed and threaded into the base 29. Resilient washers 15, such as those shown in FIGURES 2 or 3, are placed between the heads 32 and the mounting lugs 28 of the equipment. If the base 29 is subjected to a sudden and extreme shock, the force will tend to shear the bolts 30 in the absence of the resilient washers 15. However, in the arrangement shown in FIGURE 4, the resilient washers 15 are axially compressed by the suddenly applied force and their compression absorbs the force to the extent that the bolts 30 are not sheared or stressed beyond their elastic limits.

Figure 5:
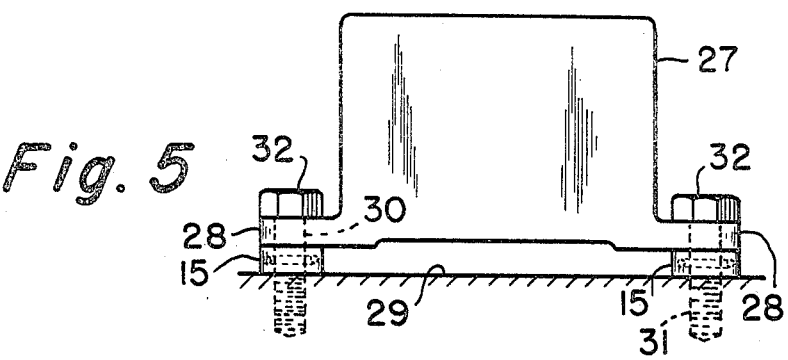

FIGURE 5 illustrates another application of the resilient washer which I have invented for mounting a piece of heavy equipment upon its base. The arrangement shown in FIGURE 5 is the same as that shown in FIGURE 4 except that the resilient washers 15 are placed on the bolts 31 between the lugs 28 and the base 29. In this arrangement the resilient washers 15 axially absorb vibrations created in the equipment 27 (which may be, for example, a heavy recriprocating engine) and thereby prevent vibrations created in the equipment 27 from being transmitted to the base 29 and the balance of apparatus of which the base 29 forms a part.

Figure 6:
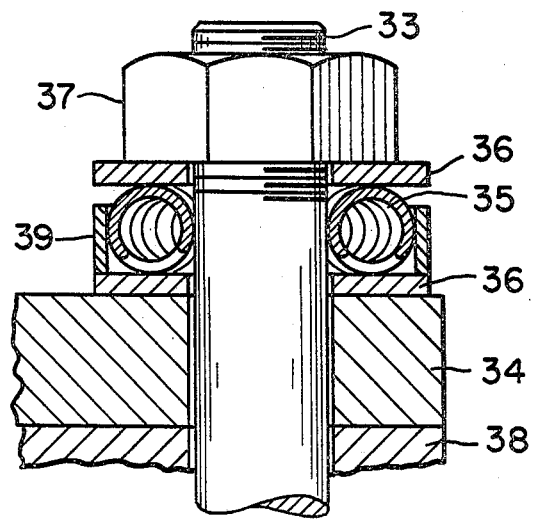
FIGURE 6 is a longitudinal section of a modified resilient washer having a load ring which forms a part of my resilient fastener.

In FIGURE 6 a modification of my resilient fastener is shown in which radial and axial deflection of the toroid can be controlled to maintain compression of the toroid within its elastic limit. A rod 33 extends through a flange 34 (partially shown) to which it is desired to apply a compressive force. A toriod 35 mounted between a pair of flat washers 36 comprises the resilient washer. A nut 37 is provided to tighten the flange 34 against a second flange 38.

A sleeve or load ring 39 is positioned around the periphery of a face of a washer 36. The load ring may be formed integrally with a washer 36; it should have a diameter no greater than the outer diameter of the washer upon which it rests. The load ring 39 extends from the face of the washer on which it is positioned toward the opposed washer; however, the upper edge is spaced from the opposed washer a distance which is no greater than the elastic limit of the toroid 35. Thus, the load ring provides a means of controlling the axially deflection of the toroid and it cannot be axially compressed beyond its elastic limit. The load ring is a pure tension member and can be designed to carry any radial load required.

The load ring increases the load carrying capacity of the toroid by a factor of two. In addition, if a load ring is used, it is unnecessary to provide grooves in the sides of the washers to hold the washers and the toriod in lateral alignment.

While I have described certain presently preferred embodiments of my invention, it is to be understood that it may be otherwise embodied.

I claim:
1. A resilient washer comprising:
   (A) at least one helical spring curved along its length to form a closed circle having a central opening;
   (B) two solid washers each having central openings and positioned on opposite sides of the spring;
   (C) whereby force applied perpendicular to each of said washers compresses the spring axially and along its length.
2. A resilient washer as described in claim 1 and including:
   (D) means for holding said washers and said spring in contact with each other and with the central openings of the spring and of said washers in line with each other for passage of a rod through all of said openings.
3. A resilient washer as described in claim 1 in which there is a second helical spring within the helical spring.
4. A resilient washer as described in claim 1 in which said washers have circular grooves in the sides of the washers contacting the helical spring for seating said spring.
5. A resilient washer as described in claim 1 and including a load ring mounted between said washers and surrounding the helical spring, said load ring having a height less than the diameter of the spring whereby upon application of forces against the washers the load ring restricts axial compression and radial deflection of the spring to within its elastic limit.
6. A resilient washer as described in claim 5 in which the load ring is secured to one of the washers.

References Cited

UNITED STATES PATENTS

| 2,914,350 | 11/1959 | Smith | 285—363 |
| 3,216,303 | 11/1965 | Malzer | 85—62 |
| 3,398,978 | 8/1968 | Gasche | 285—368 |

FOREIGN PATENTS

| 950,487 | 2/1964 | Great Britain |
| 33,309 | 9/1928 | France. |
| | | Addition to No. 610,579 |

DAVID J. WILLIAMOWSKY, Primary Examiner

W. L. SHEDD, Assistant Examiner

U.S. Cl. X.R.

85—62